US012808241B2

(12) United States Patent
Zhang et al.

(10) Patent No.: US 12,808,241 B2
(45) Date of Patent: Nov. 24, 2026

(54) BOTH OPENING AND CLOSING DIRECTIONS LOCKING DOOR STOP AND METHOD FOR BOTH OPENING AND CLOSING DIRECTIONS LOCKING OF DOOR LEAF

(71) Applicant: Ningbo Eudemon Child Protective Equipment Co., Ltd., Ningbo (CN)

(72) Inventors: Xueming Zhang, Ningbo (CN); Yingfeng Chen, Ningbo (CN); Zhen Zhang, Ningbo (CN)

(73) Assignee: Ningbo Eudemon Child Protective Equipment Co., Ltd., Ningbo (CN)

( * ) Notice: Subject to any disclaimer, the term of this patent is extended or adjusted under 35 U.S.C. 154(b) by 1 day.

(21) Appl. No.: 19/036,899

(22) Filed: Jan. 24, 2025

(65) Prior Publication Data

US 2025/0172024 A1 May 29, 2025

(30) Foreign Application Priority Data

Oct. 29, 2024 (CN) ......................... 202411518925.5
Oct. 29, 2024 (CN) ......................... 202422624734.9
Oct. 29, 2024 (CN) ......................... 202422625669.1
Oct. 29, 2024 (CN) ......................... 202422638776.8

(51) Int. Cl.
*E05F 5/02* (2006.01)
*E05C 17/44* (2006.01)

(52) U.S. Cl.
CPC .................................. *E05C 17/443* (2013.01)

(58) Field of Classification Search
CPC .......... E05C 17/00; E05C 17/46; E05C 17/54; E05C 17/44; E05C 17/025; E05C 17/443; E05C 17/50; E05C 17/446; E05F 5/02; E05F 5/06; E05F 5/08; E05F 5/18; E05F 5/00; E05Y 2900/132; E05Y 2201/212; E05Y 2201/224; E05Y 2201/246; E05Y 2201/266; E05Y 2201/484; E05Y 292/34; E05Y 292/341; E05Y 292/17; E05Y 292/278; E05Y 292/297; E05Y 16/82
See application file for complete search history.

(56) References Cited

U.S. PATENT DOCUMENTS 1,915,795 A * 6/1933 Macmillan ............ E05C 17/443 292/338
2,709,615 A * 5/1955 Barnes, Jr. ............ E05C 17/443 16/85
(Continued)

FOREIGN PATENT DOCUMENTS

CN 104265099 A * 1/2015
CN 205189573 U * 4/2016
(Continued)

*Primary Examiner* — Chuck Y Mah

(57) ABSTRACT

The invention discloses a two-way locking door stop and a method for two-way locking of a door leaf. The two-way locking door stop includes a base, a lock body and a first locking assembly, the base includes a base main body and a telescopic member, and a first surface and a second surface are respectively provided on the base main body and the telescopic member, the lock body is pivoted to the base to rotationally switch between a first state and a second state, and the first locking assembly locks rotation of the lock body in the first state to achieve two-way locking of the door leaf.

17 Claims, 13 Drawing Sheets

(56) References Cited

U.S. PATENT DOCUMENTS 3,809,419 A * 5/1974 Chezem ................ E05C 17/443 292/210
4,673,203 A * 6/1987 Chezem ................ E05C 17/443 292/338
5,282,658 A * 2/1994 Reeves, Jr. ........... E05C 17/443 292/338
5,673,952 A * 10/1997 Chezem ................ E05C 17/443 292/338
6,120,072 A * 9/2000 Benedict ............... E05C 17/443 292/338
10,508,482 B1 * 12/2019 Schaefer ............... E05C 17/443
2005/0193520 A1 * 9/2005 Bushey ................... E05C 17/54 16/82
2008/0127457 A1 * 6/2008 Deng .................... E05C 17/443 16/402
2009/0139050 A1 * 6/2009 Junkins ................... E05C 17/54 16/84
2010/0050377 A1 * 3/2010 Ritachka ................... E05F 5/04 16/83
2010/0319160 A1 * 12/2010 Rooney ................. E05C 17/443 16/82
2014/0001775 A1 * 1/2014 Mullenbach .......... E05C 17/443 292/288
2015/0361707 A1 * 12/2015 Swanberg ................. E05F 5/06 16/83
2016/0215538 A1 * 7/2016 Pistone ................. E05C 17/443
2020/0318404 A1 * 10/2020 Rashed ................... E05C 17/44
2022/0042358 A1 2/2022 Gordon
2024/0068279 A1 2/2024 Duff
2024/0068281 A1 2/2024 Napier et al.
2024/0384579 A1 * 11/2024 Wang ...................... E05C 17/54

FOREIGN PATENT DOCUMENTS

DE 102007015130 A1 * 10/2008 ............. E05C 17/56
GB 686137 A * 1/1953
JP 09324575 A * 12/1997
KR 100916357 B1 * 9/2009
KR 20100012073 U * 12/2010 ........... E05C 17/443
WO WO-2009064104 A2 * 5/2009 ........... E05C 17/443
WO WO-2012045309 A1 * 4/2012 ............. E05C 17/44

* cited by examiner

BOTH OPENING AND CLOSING DIRECTIONS LOCKING DOOR STOP AND METHOD FOR BOTH OPENING AND CLOSING DIRECTIONS LOCKING OF DOOR LEAF

TECHNICAL FIELD

The invention belongs to the field of furniture articles, and specifically relates to a door stop capable of both opening and closing directions locking of a door leaf, and a method for both opening and closing directions locking of a door leaf using the door stop.

BACKGROUND

A door stop is a device that is mounted on a door leaf to abut against the floor or the ground so as to temporarily lock the door leaf during its opening or closing. Unlike the door suction which is fixed only at a maximum opening position, the door stop can lock the door leaf at any position, thus preventing the door leaf from opening or closing. For example, in home with pets or infants, a door stop may be used to hold a bedroom door leaf in a position where only a certain gap is opened, thus achieving ventilation or preventing fingers from being pinched by closing.

Existing door stops generally employ wedges that act between the floor and a bottom end of the door leaf, or are diagonally supported on the ground (e.g., the floor) to achieve one-way locking, so they usually only need to be fixed on front and rear surfaces of the door leaf.

Therefore, it is necessary to develop a door stop which is easy to mount and use and capable of achieving both opening and closing directions locking of the door leaf.

SUMMARY

It is an object of the present invention to provide a door stop mounted at one side of a door leaf and capable of achieving both opening and closing directions locking of the door leaf, and a method for locking the door leaf using the door stop.

As a first aspect of the present invention, there is provided a both opening and closing directions locking door stop which can be fixed to a door leaf for both opening and closing directions locking thereof to prevent opening and closing of the door leaf, including:

- a base for being fixed to the door leaf, where the base includes a base main body and a telescopic member, the telescopic member is telescopically and movably arranged with respect to the base main body, the base main body is provided with a first surface for being fitted to a surface of the door leaf, and the telescopic member is provided with a second surface for being fitted to a bottom surface of the door leaf;
- a lock body, where the lock body is rotatably pivoted to the base about a pivot, the lock body is rotatably arranged between a first state and a second state, and the lock body is arranged downward parallel to the first surface in the first state;
- and a first locking assembly, where the first locking assembly acts between the lock body and the base to lock both or unlock; and the first locking assembly includes a first locking member and a second locking member.

Preferably, the both opening and closing directions locking door stop is adhesively fixed to the surface of the door leaf at the first surface and adhesively fixed to the bottom surface of the door leaf at the second surface. Alternatively, the base main body is fixed to the surface of the door leaf by screws so that the first surface abuts against the surface of the door leaf, and is adhesively fixed to the bottom surface of the door leaf at the second surface, or the second surface abuts against the bottom surface of the door leaf. Here, when the both opening and closing directions locking door stop is adhesively fixed at both surfaces, an adhesive can be preset on at least one of the first surface and the second surface, and a user can directly use the adhesive by removing a backing paper.

Preferably, a positioning mechanism or a limiting mechanism is provided on the base, where the positioning mechanism is configured to position a mounting position of the telescopic member when a retraction distance is preset, and the limiting mechanism is configured to provide retraction distances of different values for the user to adjust the mounting position of the telescopic member before mounting. Therefore, the former corresponds to a door stop having a fixed retraction distance d1, and the latter corresponds to a door stop having an adjustable retraction distance d1.

Preferably, the abutting end is made of a soft material to be pressed and deformed in the first state, so that the abutting force can be pressed and deformed to enhance an abutting force, and the soft material can also increase a force of friction with the ground. Preferably, in the first state, the lock body is vertically arranged to be fitted to the surface of the door leaf, so that the lock body is vertically arranged in the first state for locking, which is important for the both opening and closing directions locking, in which case a locking force in one direction is not too small, and in which case a distance that a lower end of the lock body protrudes from the surface of the door leaf is minimized. Therefore, the door stop is easy to use.

Preferably, the lock body includes a lock case and a case cover, the case cover is made of soft rubber and snapped at an end portion of the lock case, and the abutting end is formed on the case cover; and a plurality of air cavities are provided on an end surface of the case cover. On the one hand, the air cavities can form a negative pressure due to pressing and deformation to increase a contact force; on the other hand, the air cavities can also increase the area of contact with the ground after deformation to increase the force of friction. Here, the air cavities may preferably be composed of hemispherical cavities recessed on a surface of the case cover.

Preferably, the lock body further includes a lock cylinder mounted in the lock case, the lock cylinder is provided with a lock tongue and a first key, a first side of the lock body is provided with a first side port, a second side thereof is provided with a concave hole, the first key is arranged in the first side port, and the lock tongue is arranged at the concave hole. The first locking member includes a convex member convexly provided on one side of the base and a first lock hole penetrating or recessed on the convex member, and the concave hole and the lock tongue constitute the second locking member; and in the first state, the convex member is inserted into the concave hole to cause the lock tongue to extend into the first lock hole to lock rotation of the lock body, and the first key is configured to unlock the lock body from the first state.

Here, the first lock hole may be arranged to penetrate the convex member or recessed on the convex member, the first lock hole is preferably arranged along an axial direction of the lock body, and the lock tongue can be inserted into the first lock hole after the convex member extends into the concave hole, so that the lock body is firmly locked on the base and is not easily pulled apart by force.

According to the both opening and closing directions locking door stop described above, the second side of the lock case is further provided with a second side port, the lock cylinder is provided with a second key, the second key is arranged in the second side port, and the second key is configured to unlock the lock body from the second state, thus allowing the lock body to rotate to the first state.

According to the both opening and closing directions locking door stop described above, the lock cylinder is displaceably and movably arranged in the lock body along the axial displacement. That is, the lock cylinder is arranged along the axial direction of the lock body (i.e., a length direction thereof), so that the first key and/or the second key can displace and move along the axial displacement of the lock body to perform unlocking.

Preferably, the base further includes a pivot seat convexly provided on one side of the base main body, and the lock body is pivoted to the pivot seat, for example, by a pin in a penetrating way.

Preferably, the lock body is further provided with a lock column driven by the lock cylinder, the lock case is provided with a second lock hole, the lock column is telescopically and movably arranged in the second lock hole and is driven by the lock cylinder to displace and move to be unlocked, the pivot seat is provided with a first through hole, and in the second state, the lock column can be snapped into the first through hole to lock and hold the lock body.

Preferably, the lock body is further provided with a lock column driven by the lock cylinder, the lock column is arranged in a second lock hole located below an arm shaft hole and is driven by the lock cylinder to displace and move to unlock, and a first through hole is further provided above a first pivot hole.

As a second aspect of the present invention, there is also provided a method for both opening and closing directions locking of a door leaf, including:

- providing a door stop having the door stop structure described above, that is, the door stop described above;
- fixing the door stop to the door leaf, ensuring that a length of a working section of a lock body is greater than a distance from a pivot to the ground during fixing, where the length of the working section of the lock body refers to a distance from an end of the lock body to the pivot in a natural state; and
- operating the door leaf and the door stop to achieve both opening and closing directions locking of the door leaf, specifically including: when the door leaf is opened and in a position to be locked, turning the lock body until the end thereof is in contact with the ground and pushing the door leaf toward the door stop to cause the lock body to fit with the base, so that a first locking member is engaged with a second locking member to lock rotation of the lock body.

According to the method described above, when the door stop is fixed to the door leaf, after the lock body is rotated to a first state, the door stop is fitted to the door leaf, a telescopic member is adjusted to be displaced upward with respect to the ground by a predetermined distance, then the lock body is rotated to a second state, a lower end of the telescopic member is positioned close to the ground, and a base main body is mounted to the door leaf, and finally the telescopic member is moved up to fit to a bottom end face of the door leaf. Alternatively, it is also feasible and more convenient that the telescopic member of the door stop is provided with a maximum extension length in advance or a telescoping value thereof is marked. That is, the position of the telescopic member is adjusted with reference to the value of the distance between the pivot of the door stop itself and the end surface of the lock body instead of referring to the door leaf and the ground to control an extension length of the telescopic member or mark numerical change of the telescopic member with respect to a first main body.

According to the method described above, when unlocking is required, the first key is driven to displace to unlock a first locking assembly, and the lock body is rotated to the second state to cause the lock body to fit with the surface of the door leaf, so that the door stop is aesthetically stowed in an unlocked state.

The both opening and closing directions locking door stop and the method for locking the door leaf of the present invention have at least the following beneficial effects:

1. Only one door stop is mounted at one side of the door leaf to achieve the both opening and closing directions locking of the door leaf, which solves the shortcoming that the traditional door stop can achieve one-way locking only.

2. The door stop has a compact structure, is easy to mount and use, and can fit the surface of the door leaf for stowage when not in use, and will not be damaged by knocking when opening and closing the door, and is not easy to collide with the human body and hurt people.

3. When the door stop is in the locked state (i.e., the first state), the lock body acts substantially vertically on the floor (i.e., substantially perpendicular to the ground), has a small footprint and is not prone to tripping personnel, and has sufficient locking strength in both directions, without significant lack of strength in one direction.

4. The door stop can be adhesively fixed to the surface and the bottom surface of the door leaf, can provide sufficient locking force for the door leaf in the locked state in combination with its structural relationship and force direction, and the base is a telescopic structure to adapt to door leaves with different ground clearances.

DESCRIPTION OF THE EMBODIMENTS

Figure 1:
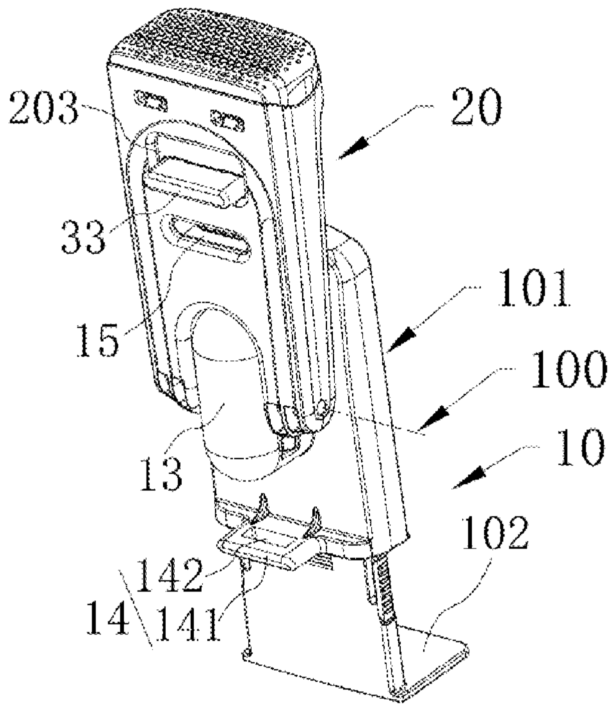
FIG. 1 is a first structural schematic view of a door stop according to the present invention, where the door stop is in an unlocked state, that is, a second state.

The protection scope of the present invention will be described below in detail with reference to the embodiments of the present invention and the accompanying drawings. It should be noted that the following description is exemplary and intended to facilitate the understanding of the present invention rather than limiting the protection scope of the present invention. All conventional changes made on the basis of the embodiments shall fall within the protection scope of the present invention.

A both opening and closing directions locking door stop for being fixed to a door leaf for both opening and closing directions locking thereof to prevent opening/closing of the door leaf, includes:

- a base 10 for being fixed to the door leaf, where the base 10 includes a base main body 11 and a telescopic member 12, the telescopic member 12 is telescopically and movably arranged with respect to the base main body 11, the base main body 11 is provided with a first surface 101 for being fitted to a surface of the door leaf, and the telescopic member 12 is provided with a second surface 102 for being fitted to a bottom surface of the door leaf;
- a lock body 20, where the lock body 20 is rotatably pivoted to the base 10 about a pivot 100, the lock body 20 is rotatably arranged between a first state and a second state, and the lock body 20 is arranged downward parallel to the first surface 101 in the first state; and
- a first locking assembly, where the first locking assembly acts between the lock body 20 and the base 10 to lock both or unlock; and the first locking assembly includes a first locking member 14 and a second locking member 15.

Preferably, the door stop is provided with an adhesive at both the first surface 101 and the second surface 102 for adhesive fixing.

Preferably, the lock body 20 is abutted against the ground 402 via a soft material, such as soft rubber, to enhance the force.

Preferably, a first key and a second key are provided on both sides of the lock body respectively, and a second locking assembly is also provided in the second state, and pressing the two keys can simultaneously drive the first locking assembly and the second locking assembly to unlock so as to keep locked in the first state and keep stowed in the second state.

A method for both opening and closing directions locking of a door leaf, includes:

- providing a door stop having the door stop structure described above, that is, a door stop of any of the structures described above;
- fixing the door stop to the door leaf, ensuring that a length of a working section of a lock body 20 is greater than a distance from a pivot 100 to the ground 402 during fixing, where the length of the working section of the lock body 20 refers to a distance from an end of the lock body 20 to the pivot 100 in a natural state; and
- operating the door leaf and the door stop to achieve both opening and closing directions locking of the door leaf, when the door leaf is opened and in a position to be locked, turning the lock body 20 until the end thereof is in contact with the ground and pushing the door leaf toward the door stop to cause the lock body 20 to fit with the base 10, so that a first locking member 14 is engaged with a second locking member 15 to lock rotation of the lock body 20.

Preferably, when the door stop is fixed to the door leaf, after the lock body 20 is rotated to a first state, the door stop is fitted to the door leaf, a telescopic member 12 is adjusted to be displaced upward with respect to the ground 402 by a predetermined distance, then the lock body 20 is rotated to a second state, a lower end of the telescopic member 12 is positioned close to the ground 402, and a base main body 11 is mounted to the door leaf, and finally the telescopic member 12 is moved up to fit to a bottom end face of the door leaf. Alternatively, it may be a state in which the telescopic member 12 of the door stop is provided in advance with a maximum extension length thereof which is at a predetermined distance from the recommended upward displacement value after the positioning, or a telescoping value may be marked on the telescopic member for manual adjustment by the user.

Embodiment 1

The present embodiment relates to a door stop acting on a door leaf to achieve both opening and closing directions locking of the door leaf, by which opening and closing of the door leaf can be subject to both opening and closing directions locking, so that the door stop can act on the door leaf when the door leaf is opened to an arbitrary position in the middle, thus preventing the door leaf from closing and further opening, which is called a both opening and closing directions locking function of the door stop to the door leaf.

Figure 2:
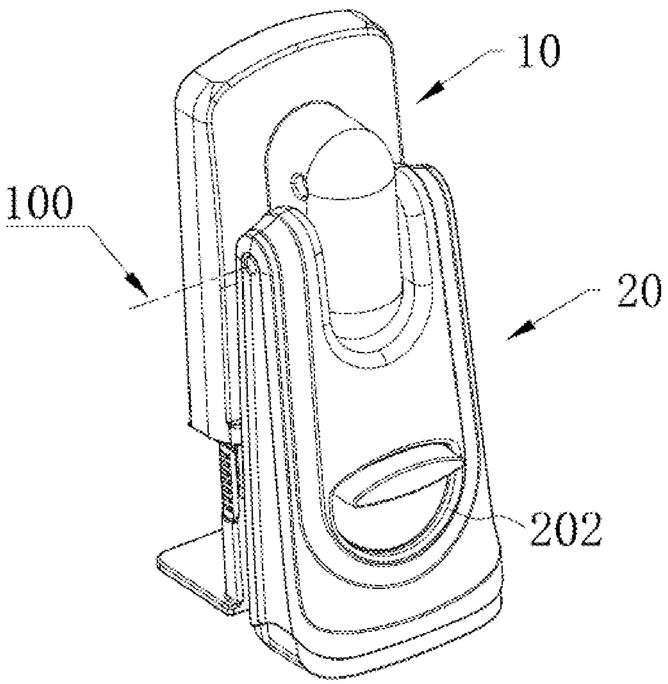
FIG. 2 is a structural schematic view of the door stop of the embodiment of FIG. 1 when the door stop is transitioned to a locked state, that is, a first state in which a telescopic member is in a non-mounted state.

As shown in FIGS. 1 and 2, the door stop is composed of a base 10 and a lock body 20 which are pivotally connected to each other, that is, the lock body 20 is rotatably pivotally connected to the base 10 about a pivot 100 as a rotation axis, and the base 10 is configured to be fixed to a door leaf, for example, by adhesive fixing, so that the base 10 is fixed to the door leaf; the lock body 20 is then configured to be pivoted into contact with the ground for locking when the door leaf needs to be locked, that is, the door leaf is locked by abutment of an abutting end 204 provided at one end of the lock body 20 against the ground 402 (e.g., the floor).

Figure 3:
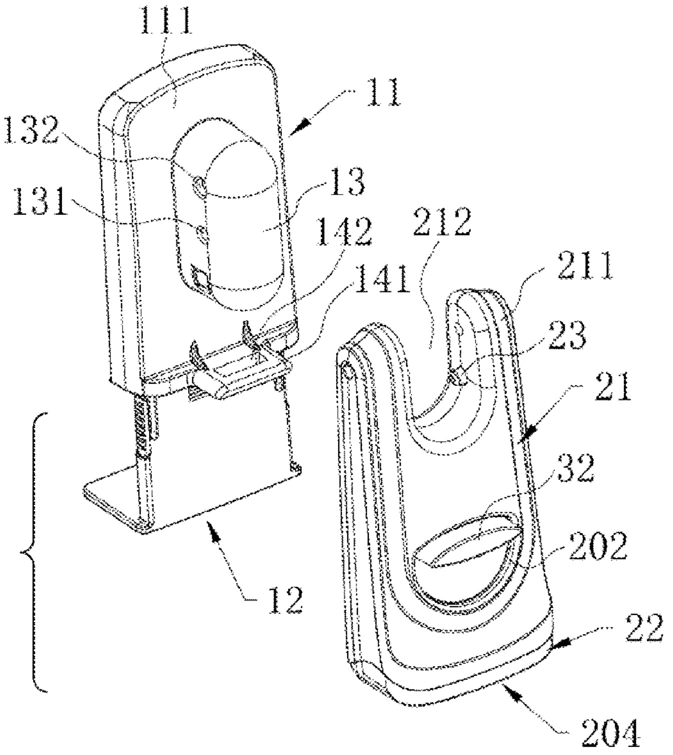
FIG. 3 is a structural exploded view of FIG. 2.

As shown in FIG. 3, the base 10 is mainly composed of a base main body 11 and a telescopic member 12, the base main body 11 is configured to be fixed to the door leaf, preferably to one of a front surface and a rear surface of the door leaf, the telescopic member 12 is configured to be fitted and fixed to a lower surface of the door leaf, and the telescopic member 12 is arranged to telescopically movable with respect to the base main body 11 in an up-down direction, where the up-down direction is a vertical direction parallel to one of the front surface and the rear surface of the door leaf (i.e., the up-down direction shown in FIG. 3).

In the present embodiment, both the base main body 11 and the telescopic member 12 are adhesively fixed to the door leaf. For example, 3M adhesive is provided on the first surface 101 and the second surface 102 in advance, and a user firstly removes the backing paper (i.e., release paper) of the 3M adhesive at the first surface 101 during mounting, and then fixes the base 10 to the front surface or the rear surface of the door leaf; and the backing paper of the 3M adhesive at the second surface 102 is then removed (of course, it can also be removed together with the release paper at the first surface 101), and the telescopic member 12 is adjusted to be displaced upward to approach the lower surface of the door leaf until the second surface 102 is adhesively fixed to the lower surface of the door leaf. In other embodiments, the fixing between the base main body 11 and the telescopic member 12 and the front surface and the rear surface and the lower surface of the door leaf may be performed in other known manners, such as a screw fixing. Alternatively, they are fixed at the first surface 101 only and they are fitted to or abuts against the second surface 102 without fixed connection. In addition, a telescopic structure used by the base 10 may also function to adapt to door leaves with different ground clearance.

The base main body 11 is further divided into a first main body 111 and a second main body 112, the first main body 111 is a hollow quasi-rectangular seat body, an interior thereof is hollow to form a cavity for the telescopic member 12 to move telescopically therein, a pivot seat 13 is convexly provided at one side of the first main body 111, a first pivot hole 131 is provided on a side wall of the pivot seat 13, a first through hole 132 is provided above the first pivot hole 131 and at an appropriate distance, the first pivot hole 131 is arranged near a middle portion of the pivot seat 13, and the pivot 100 is arranged in the first pivot hole 131 in a penetrating way, that is, a pin (not shown in the figure) is inserted into the first pivot hole 131 to allow the lock body 20 to be pivoted about the pivot 100 with respect to the base 10, and the first pivot hole 131 is configured to allow the lock column 23 to be snapped thereinto in a stowed state.

The telescopic member 12 is an L-shaped flat member, a side surface thereof is L-shaped, has a certain width in a left-right direction and is slightly smaller than the first main body 111 so as to be telescopically and movably arranged; the telescopic member 12 can be divided into a first arm 1211 and a second arm 1212 which are integrally formed and are perpendicular to each other; the first arm 1211 is telescopically and movably arranged in the first main body 111; and the second arm 1212 is configured to be fitted to or fixed at a lower surface of the door leaf. The first surface 101 is formed by one side surface of the first main body 111, that is, the other side surface away from the pivot seat 13, and the second surface 102 is formed by an upper surface of the second arm 1212.

A first locking member 14 is also provided on the first main body 111, and located below the pivot seat 13 for forming a lockable or unlockable first locking assembly with a second locking member 15 provided on the lock body 20 so as to lock the door in a first state.

Figure 4:
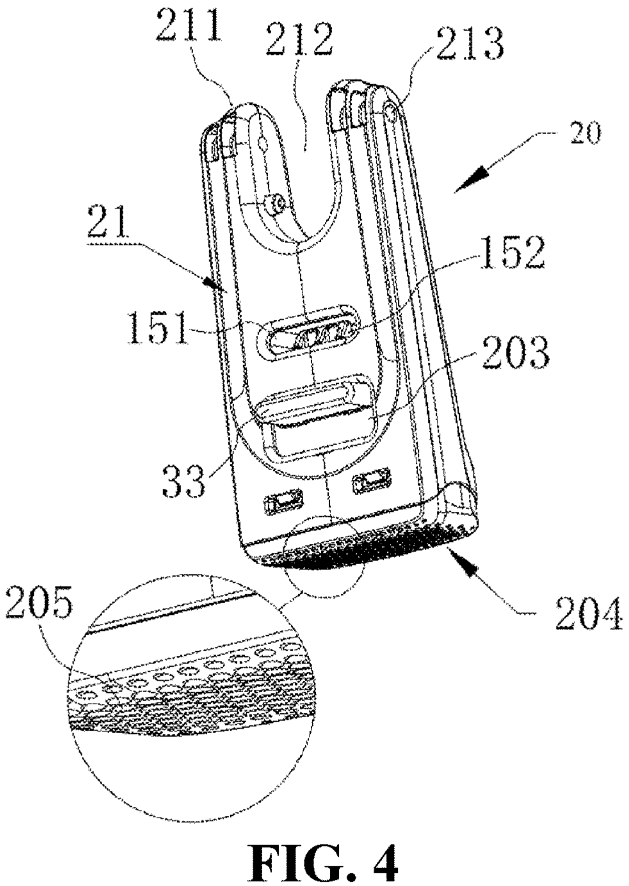
FIG. 4 is a perspective structural schematic view of a second side of a lock body in FIG. 3.
Figure 5:
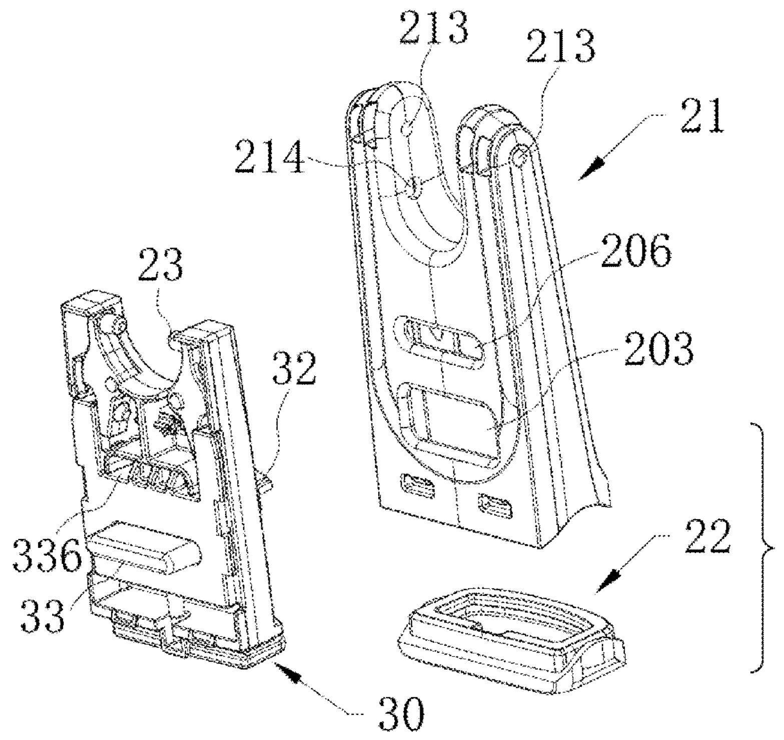
FIG. 5 is a structural exploded view of FIG. 4.
Figure 6:
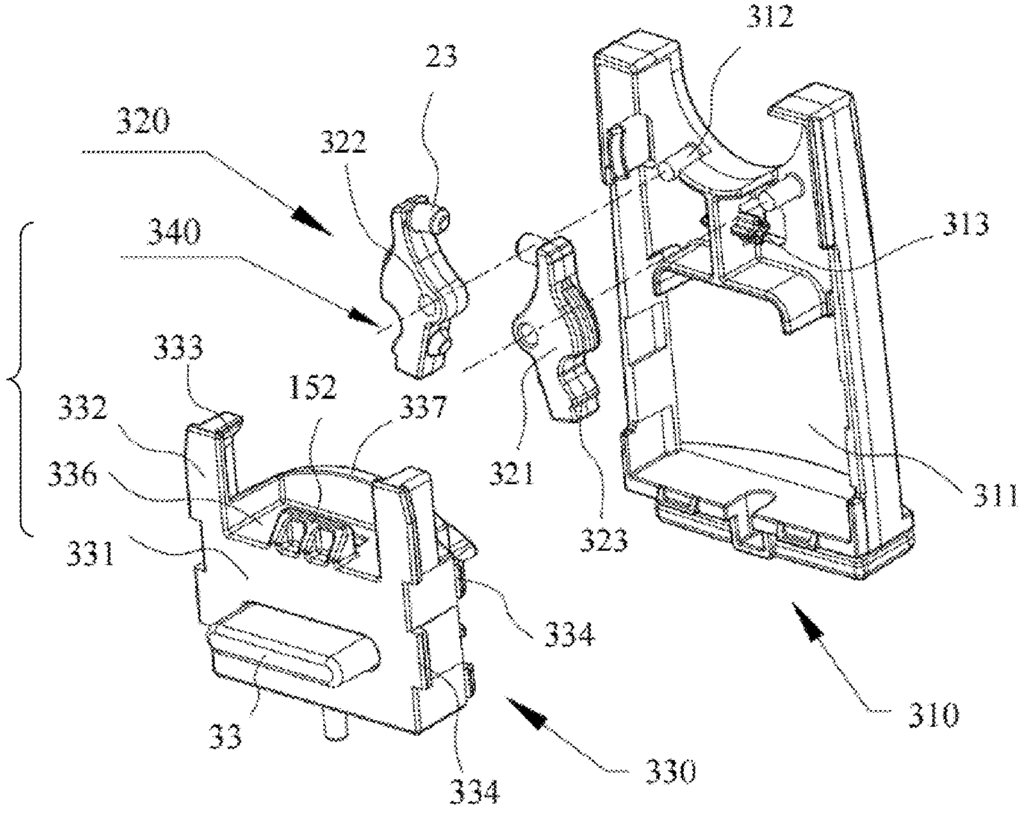
FIG. 6 is a structural exploded view of a lock cylinder in FIG. 5.

As shown in FIGS. 4-6, the lock body 20 includes a lock case 21 and a case cover 22, and a lock cylinder 30 mounted in the lock case 21, where a main body portion of the lock cylinder 30 is housed in the lock case 21, and a portion to be operated is exposed to be operated by a user. After assembly, two rotating arms 211 and an arm cavity 212 formed between the two rotating arms 211 are formed at an upper end of the lock body 20, and arm shaft holes 213 are respectively provided on the two rotating arms 211, so that the lock body 20 is pivotably connected to the pivot seat 13 by a pin.

The case cover 22 is connected to a lower end of the lock cylinder 30 and blocks a lower port of the lock case 21, and the case cover 22 is made of a soft rubber material, such as rubber, so that when the lock body 20 is rotated to the first state to lock the door leaf 401, the case cover 22 can be deformed to accumulate energy and increase a force of friction; and the abutting end 204 is formed on a surface of the case cover 22 and is provided with a plurality of air cavities 205 thereon to further increase the force of friction and ensure that the door stop can provide a sufficient locking force to the door leaf.

The door stop can achieve both opening and closing directions locking of the door leaf on the basis that the lock body 20 abuts against the floor (or ground) nearly vertically, deformation of the case cover 22 made of soft rubber can increase a vertical acting force and lateral friction, the lock body 20, which is originally pivotably arranged with respect to the base 10 is locked against rotation by the first locking assembly, and the door stop is adhesively fixed at both the first surface 101 and the second surface 102, which provides a sufficient locking force when the door 401 is opened or closed as the two surfaces are perpendicular to each other.

A second lock hole 214 is also provided on both side walls of the arm cavity 212, that is, on the two rotating arms 211, for the lock column 23 to be telescopically and movably arranged therein. That is, the lock column 23 can be in an extended state as shown in FIG. 4, and can also be driven by the lock cylinder 30 to retract to be flush with surfaces of the rotating arms 211. As the first through hole 132 is arranged on the side wall of the pivot seat 13, when the lock body 20 is rotated to an upward second state, the lock column 23 is snapped into the first through hole 132 to lock and keep the lock body 20 in this position, that is, in the second state, thus achieving the effect that the door stop is kept in an unlocked position, and at this time, the lock body 20 faces upward close to the surface of the door leaf, thus achieving stable stowage of the door stop when not in use, and resulting in a relatively beautiful shape, as shown in FIG. 1.

As shown in FIGS. 3 and 4, a first side port 202 is formed on a first side surface of the lock body 20, and the first key 32 is assembled at the first side port 202 so as to be movably arranged to slide up and down therein for locking or unlocking rotation of the lock body 20 with respect to the base 10; and a second side port 203 is formed on a second side surface of the lock body 20, and a second key 33 is assembled at the second side port 203 and movably arranged up and down therein to slide to operate to lock or unlock the rotation of the lock body 20.

A second locking member 15 for locking the lock body 20 to the base 10 in the first state is also provided on the second side surface, while a first locking member 14 is correspondingly provided on the base main body 11. In the present embodiment, the first locking member 14 is mainly composed of a convex member 141 convexly provided at a lower end of the first main body 111 and is provided with a first lock hole 142 arranged in a penetrating manner, while the second locking member 15 is composed of a concave hole 151 recessed on the second side surface of the lock body 20 and a lock tongue 152 movably provided in the concave hole 151. When the lock body 20 is rotated to the first state, the convex member 141 is snapped into the concave hole 151 and the lock tongue 152 extends into the first lock hole 142, thus locking the lock body 20, and since the first locking member 14 and the second locking member 15 are arranged away from the pivot 100, the two locking members have sufficient locking strength to the lock body 20, and the lock tongue 152 extends into the first lock hole 142 in a direction parallel to the door leaf, so that previous locking connection therebetween will not be pulled apart to cause accidental unlocking.

Preferably, the convex member 141 is integrally formed on the first main body 111, and the concave hole 151 is jointly formed by a third side port 206 formed on a second side surface of the lock case 21 and a concave cavity 336 formed on the lock cylinder 30 to allow the convex member 141 to pass through the third side port 206 and be assembled in the concave cavity 336.

As shown in FIGS. 5 and 6, the lock cylinder 30 includes an assembly member which is a quasi-rectangular member as a whole, a top end thereof has a U-shaped recess and cylinder arms located on both sides, the lock column 23 is arranged at the cylinder arms, and the first key 32 and the second key 33 are respectively arranged on both sides of a lock cylinder main body 31. The lock cylinder 30 is composed of a lock cylinder member 310 and an unlocking member 330, the unlocking member 330 is movably arranged up and down with respect to the lock cylinder member 310, the first key 32 and the second key 33 are both arranged on the unlocking member 330, a return spring (not shown in the figures) is provided between the unlocking member 330 and the lock cylinder member 310 so that the unlocking member 330 is initially placed at an upper position, and the first key 32 or the second key 33 are forced to displace the unlocking member 330 downward (in the downward direction in FIG. 6), thus driving the lock column 23 to retract and unlock.

As shown in FIG. 6, the lock cylinder member 310 is provided with a first mounting port 311 for the unlocking member 330 to be assembled and movable up and down therein, a first snap protrusion 341 and a second snap protrusion 342 for being snapped onto a side wall of the first mounting port 311 are respectively provided on inner and outer sides of a side edge of the unlocking member 330, and the lock cylinder member 310 is formed as a strip-shaped side wall at the side wall of the first mounting port 311 for being snapped between the first snap protrusion 341 and the second snap protrusion 342 to realize fitting connection and up-down movable arrangement of the unlocking member 330 with respect to the lock cylinder member 310.

The lock tongue 152 is arranged at an upper end of the unlocking member 330 and extends upward. Cavities are provided on both sides of the lock tongue 152 for forming the concave cavity 336; and driving arms 332 are respectively provided at both sides of the upper end of the unlocking member 330 for driving a swing member 320 to move so as to drive the locking column 23 to move telescopically in the second lock hole 214. The swing member 320 is composed of two swing arm members 321 arranged in pairs and symmetrically, and each swing arm member 321 is rotatably arranged with a pivot swing shaft 340 as an axis, for example, a swing column 312 is provided on the lock cylinder member 310, and a swing shaft hole 322 is provided at a middle portion of the swing arm member 321, and the swing shaft hole 322 is sleeved on the swing column 312. Since the two swing arm members 321 are arranged symmetrically, their respective swing axes 340 are parallel to each other. Preferably, the swing shaft hole 322 is arranged at a middle position of the swing arm member 321, the lock column 23 is arranged at an upper end of the swing arm member 321 and can extend from the second lock hole 214, and a spring acts between an inner side of a lower end of the swing arm member 321 and a spring seat 313 provided on the lock cylinder part 310, so that the lock column 23 is initially held extending out of the second lock hole 214. A first contact surface 323 is formed at an outer side of the lower end of the swing arm member 321, and a second contact surface 333 is provided on an inner side wall of the driving arm 332. When the unlocking member 330 is displaced downward under the action of the first key 32 or the second key 33, the second contact surface 333 acts on the first contact surface 323 to rotate around the pivot swing shaft 340, and the lock column 23 is retracted into the second lock hole 214.

The mounting process of the door stop is as follows.

Firstly, the door stop is fixed at a predetermined position on the door leaf 401, where there is a requirement for the fixed position of the door stop is fixed, that is, the fixed position of the door stop in the up-down direction is related to its locking action. When fixed, a length of a working section of the lock body 20 should be greater than a distance from the pivot 100 to the ground 402, and the length of the working section of the lock body 20 refers to a distance from an end of the lock body 20 to the pivot 100 in a natural state.

Specifically, the door stop can be fixed in one of the following ways:

1. A mounting length of the telescopic member 12 with respect to the base 10 is adjusted to control a mounting position of the door stop on the door leaf.

The user can operate as follows.

Figure 7:
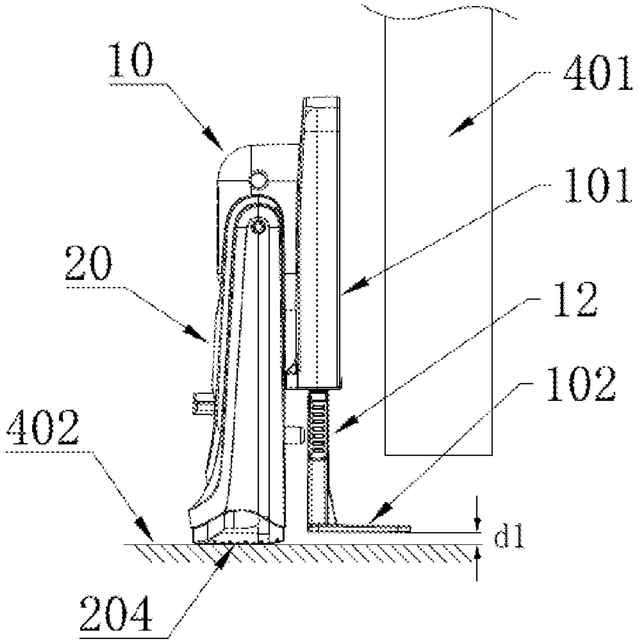
FIG. 7 is a schematic view of telescoping positioning of the door stop of the present invention during mounting.

Referring to FIG. 7, the door stop is first adjusted to the first state, and then fitted to the vicinity of a lower end of the door leaf 401 to bring the abutting end 204 at the lower end of the lock body 20 into contact with the ground 402, and a telescopic state of the telescopic member 12 is adjusted to be retracted upward by a certain distance d1 with respect to the base main body 11.

Figure 8:
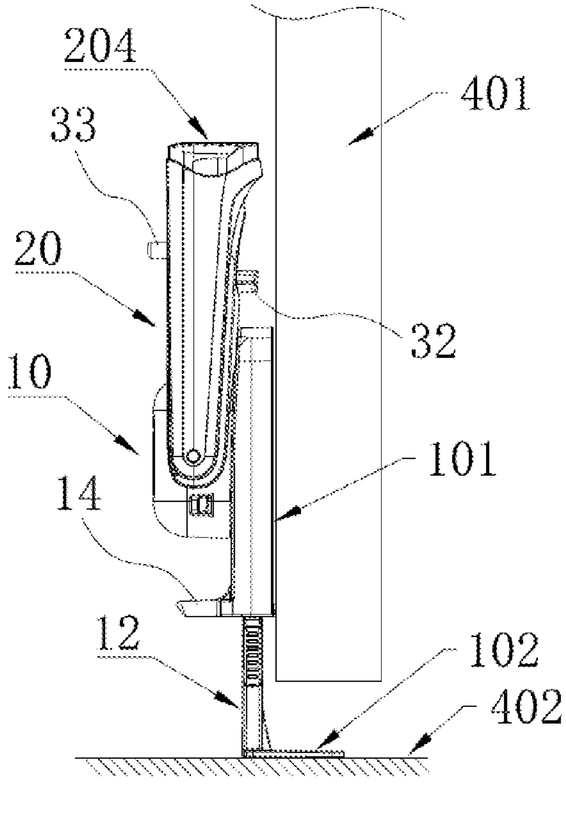
FIG. 8 is a schematic view of mounting of the door stop after positioning in FIG. 7 to be fixed at a first surface.
Figure 9:
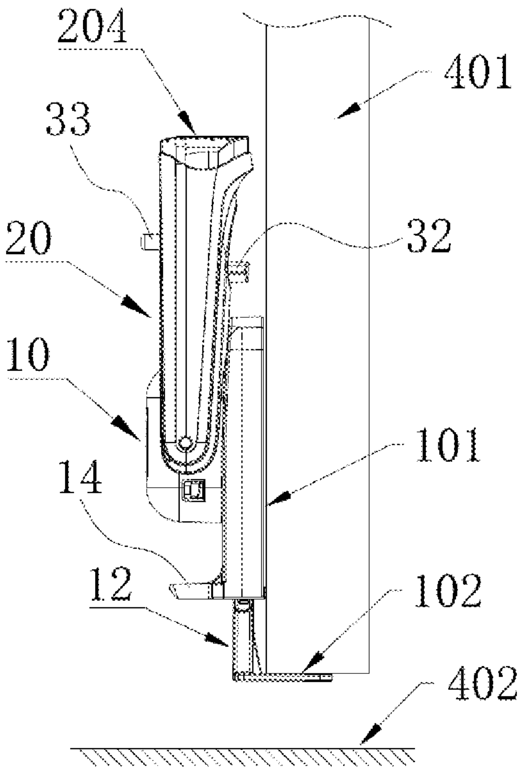
FIG. 9 is a schematic view of the door stop with a telescopic member adjusted to position based on FIG. 8 to be fixed at a second surface.

Then, the lock body 20 is rotated to a position deviating from the first state, for example, to a second position, as shown in FIG. 8, and the first surface 101 is adhesively fixed to a front surface of the door leaf 401. Finally, the telescopic member 12 is displaced upward until the second surface 102 is adhesively fixed to a bottom end surface of the door leaf, forming a mounting state as shown in FIG. 9, which is also a second state (or referred to as a stowed state) of the door stop.

2. Other Position Adjustment

Of course, when adjusting d1, the door stop may not be fitted to the lower end of the door leaf 401 to be mounted for reference operation, but the door stop may be adjusted to the first state and vertically placed on a reference plane (e.g., substantially vertically placed on a table top), and then the telescopic member 12 may be adjusted to retract upward by the distance d1.

Alternatively, instead of relying on the reference plane, the telescopic member 12 is manually adjusted to retract upward by the distance d1. In this case, an appropriate value or gear position can be marked on the telescopic member 12, and the user can adjust the telescopic position of the telescopic member 12 according to his/her own needs during mounting, and then mount the telescopic member as shown in FIGS. 8 and 9.

Alternatively, the structure of the telescopic member 12 is designed to limit a maximum telescopic distance thereof, and a maximum extension position thereof is a state after it retracts by the preset retraction distance d1, that is, the retraction distance can not be adjusted by the user but is preset at the factory.

Secondly, after the door stop is fixed, both opening and closing directions locking of the door leaf can be realized by operating the door stop state, and the process is as follows.

In order to operate the door leaf and the door stop to achieve the both opening and closing directions locking of the door leaf, the door leaf is opened to a position to be locked, then the lock body 20 is rotated until the end thereof is in contact with the ground and then the door leaf is pushed toward the door stop to cause the lock body 20 to fit with the base 10, so that the first locking member 14 is engaged with the second locking member 15 to lock the rotation of the lock body 20, that is, a locked state of the door stop is formed, and the door leaf is locked so as not to be opened or closed.

In addition, when unlocking, the first key 32 is driven to displace to unlock the first locking assembly, and the lock body 20 is rotated to the second state to cause the lock body 20 to fit to the surface of the door leaf, thus achieving unlocking and stowage.

Figure 10:
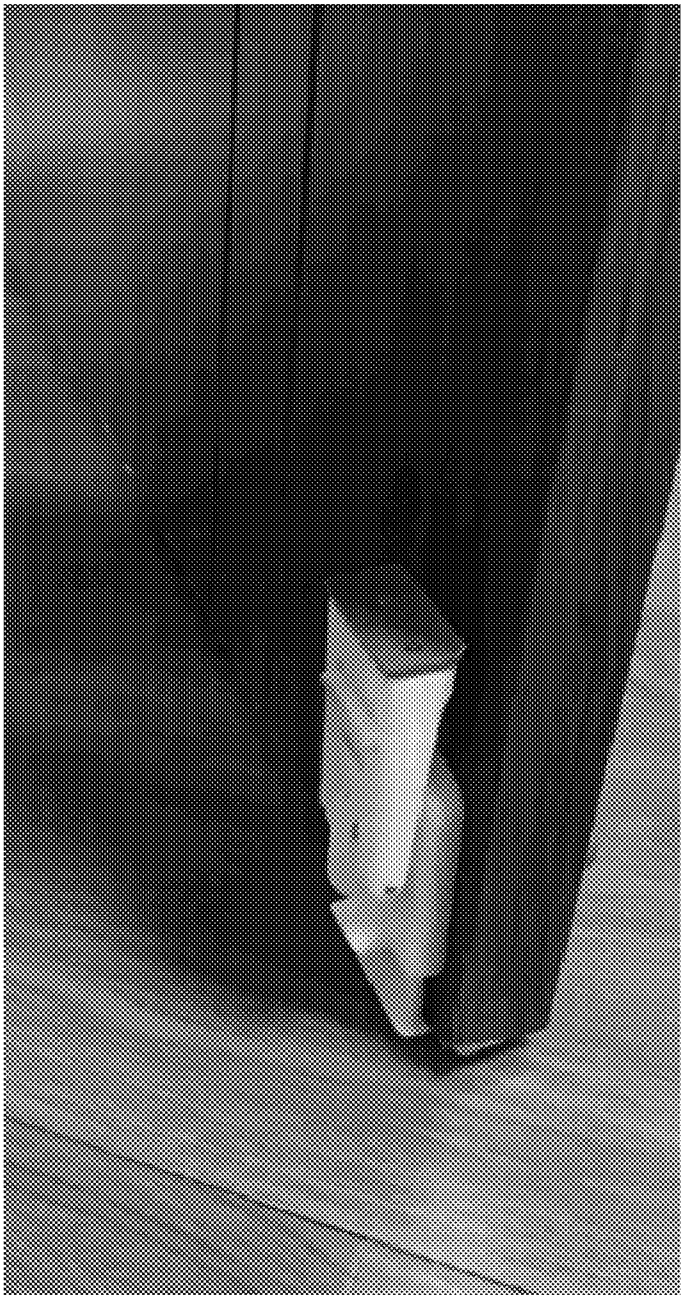
FIG. 10 is a mounting photograph of the door stop of the present invention during test.
Figure 11:
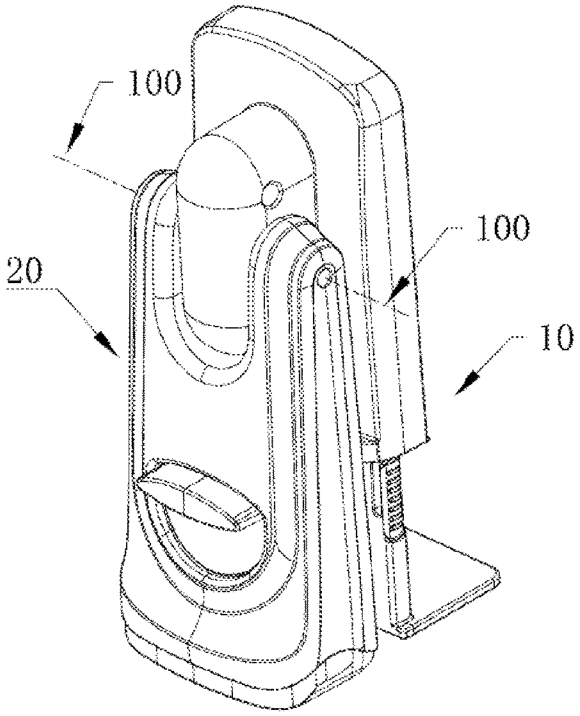
FIG. 11 is a second structural schematic view of the door stop according to the present invention.

In order to evaluate the actual effect of the door stop, the door stop of Embodiment 1 was subjected to 3D printing to produce a hand board, and the hand board door stop was subjected to locking effect testing. Here, 3M adhesive was applied to the first surface 101 and the second surface 102 of the hand board, the ground 402 of the test place was composite flooring, the door leaf under test was an inward-opening indoor wood door, and the door stop was mounted on the front side surface of the door leaf. The test scenario is as shown in FIG. 10.

By repeating the test a plurality of times, the following test results were obtained:

1. When the retraction distance d1 is 3 mm, the measured locking force of the door opening is greater than 30 kg, and the measured locking force of the door closing is greater than or equal to 15 kg.
2. When the retraction distance d1 is 4 mm, the measured locking force of the door opening is greater than 30 kg, and the measured locking force of the door closing is greater than or equal to 16 kg.
3. When the retraction distance d1 is 5 mm, the measured locking force of the door opening is greater than 30 kg, and the measured locking force of the door closing is greater than or equal to 20 kg.

The measurement data is tabulated as follows:

TABLE 1

Both opening and closing directions locking force test table

| SN | Distance d1 | Door opening locking force | Door closing locking force |
|---|---|---|---|
| 1 | 3 mm | >30 kg | ≥15 kg |
| 2 | 4 mm | >30 kg | ≥16 kg |
| 3 | 5 mm | >30 kg | ≥20 kg |

It can be seen that the mounting of the door stop of the present invention can achieve the effects that the door opening locking force is greater than 30 kg and the door closing locking force is greater than or equal to 15 kg, which fully satisfies the requirements for the both opening and closing directions locking of the door leaf in daily life, meets the requirements for this use scenario of the indoor door locking, and the door stop is aesthetically pleasing and easy to mount and operate.

As shown in FIGS. 11-16, the base 10 of the both opening and closing directions lockable door stop according to Embodiment 1 has the following specific structure.

Figure 12:
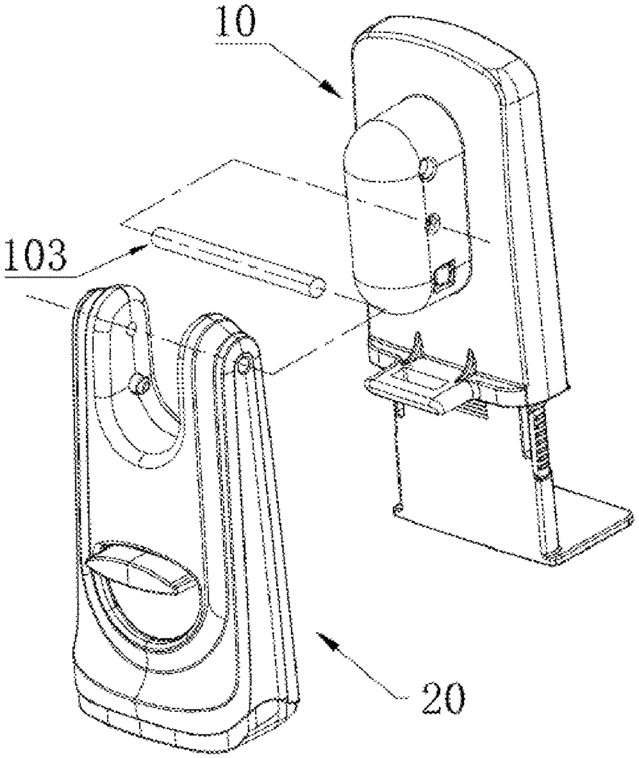
FIG. 12 is a structural exploded view of FIG. 11.

As shown in FIG. 12, shaft holes are respectively provided on the base 10 and the lock body 20, and a shaft pin 103 is provided between the shaft holes to realize rotational pivotal connection between the lock body 20 and the base 10 so as to form the pivot 100.

Figure 13:
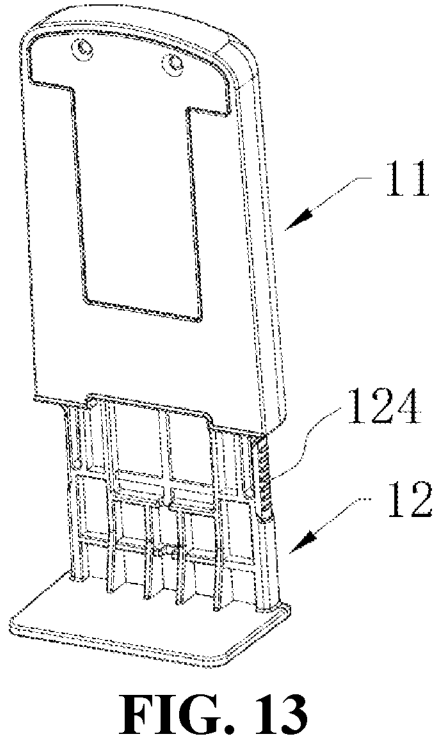
FIG. 13 is a structural schematic view of a base in FIG. 11.
Figure 14:
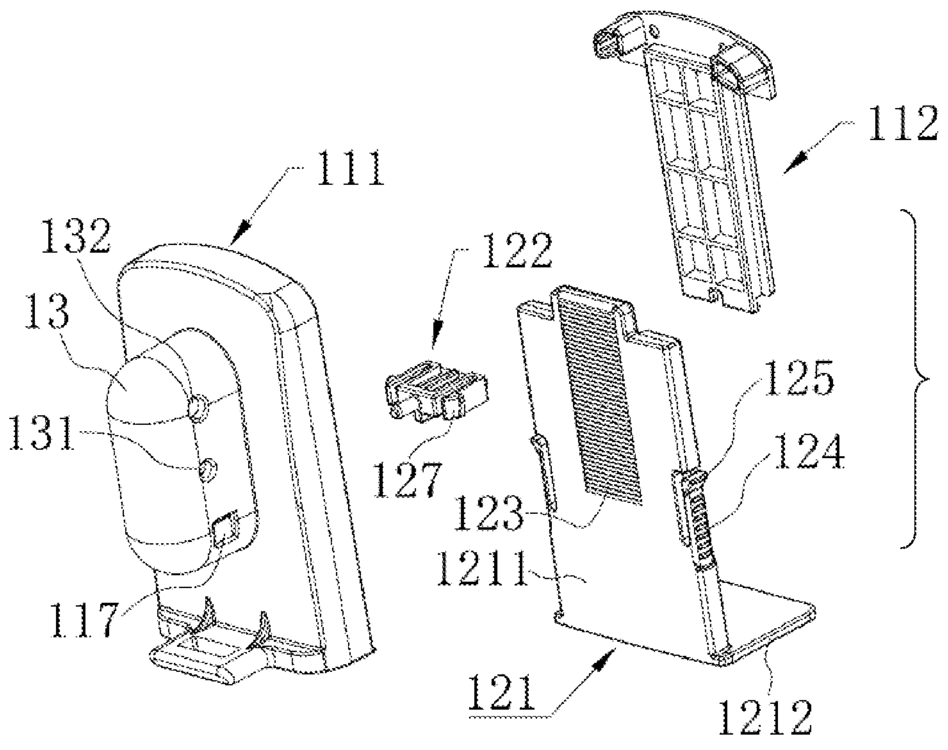
FIG. 14 is a structural exploded view of FIG. 13.

As shown in FIGS. 13 and 14, the base 10 is composed of two parts, namely, a base main body 11 and a telescopic member 12, the telescopic member 12 is movably and adjustably arranged with respect to the base main body 11, the base main body 11 is configured to be fitted to the front surface or the rear surface of the door leaf, the telescopic member 12 is composed of an L-shaped adjusting member 121, the L-shaped adjusting member 121 is composed of a first arm 1211 and a second arm 1212 which are substantially perpendicular to each other so as to form an L-shaped member, the two arms are integrally formed, the first arm 1211 is configured to be telescopically movable within the base main body 11 for adjustment, and the second arm 1212 is configured to be fitted to the lower surface of the door leaf, that is, the bottom end surface of the door leaf.

The base main body 11 is further formed by a first main body 111 and a second main body 112 which are mutually snap-fitted, preferably fastened by screws, and a cavity 113 is formed inside the base main body 11 for the first arm 1211 to telescopically move therein. A pivot seat 13 is also formed in a protruding way at a front surface of the base main body 11, and a first pivot hole 131 is formed on the pivot seat 13 for the shaft pin 103 to be placed therein. A second lock cavity 116 is also formed inside the pivot seat 13 for a telescopic locking member 122 to be provided therein. One end of the telescopic locking member 122 abuts against a bottom wall of the second lock cavity 116 via a spring (not shown in the figure), and the other end thereof is formed with a toothed fourth locking member 126 which is a one-way tooth that allows the telescopic member 12 to contract upward while preventing it from extending downward.

Figure 15:
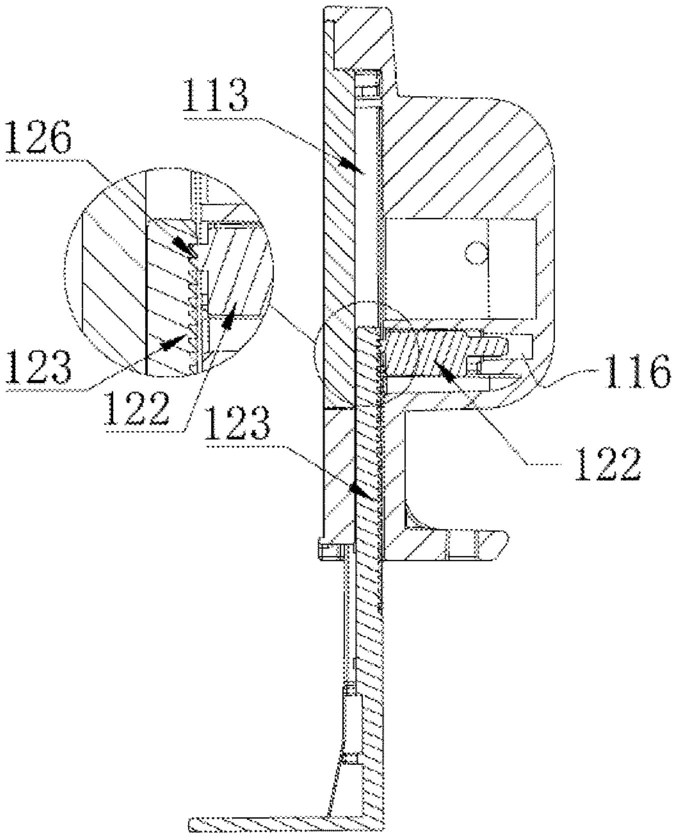
FIG. 15 is a cross-sectional structural schematic view of FIG. 13 and a partially enlarged schematic view thereof.
Figure 16:
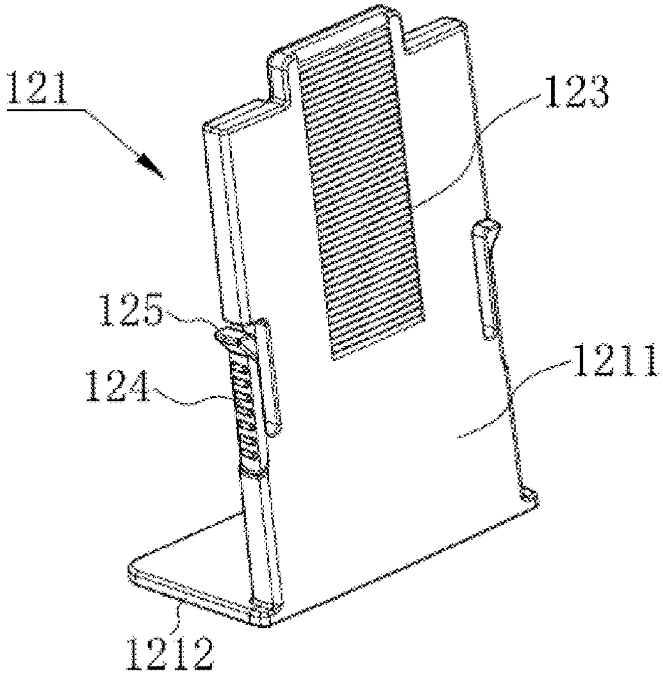
FIG. 16 is a structural schematic view of an L-shaped adjustment member in FIG. 13.
Figure 17:
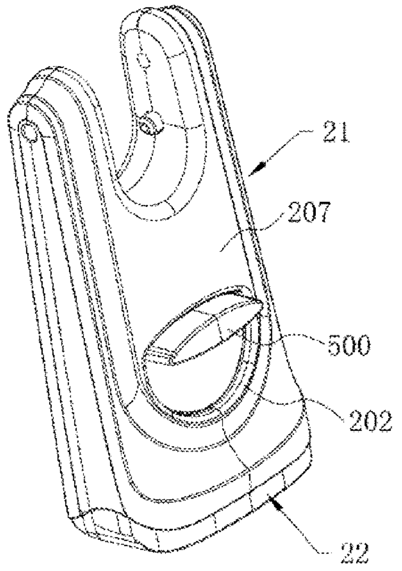
FIG. 17 is a structural schematic view of a lock body of the door stop of the present invention.

As shown in FIGS. 15-16, a rack-shaped third locking member 123 is correspondingly provided on the second arm 1212 of the telescopic member 12, and the third locking member 123 is also formed by a one-way tooth arrangement to achieve one-way locking of the telescopic member 12. In addition, an elastic sheet 124 is respectively provided on both sides of the first arm 1211, a telescopic snap protrusion 125 is formed at an end of the elastic sheet 124, and the telescopic snap protrusion 125 is configured to be snap-fitted with the base main body 11 to limit upward displacement of the telescopic member 12, for example, abutting against a lower end surface of the base main body 11 or being snapped in a groove of a side wall of the cavity 113, where when the telescopic snap protrusion 125 abuts against the lower end surface of the base main body 11, a retraction distance of the telescopic member 12 before mounting can be preset, and when the telescopic snap protrusion 125 is snapped in the groove of the side wall of the cavity 113, the retraction distance before mounting can be preset or a plurality of grooves can be provided for adjustment by the user to prevent upward displacement of the telescopic member 12, so that the upward displacement of the telescopic member 12 with respect to the base main body 11 is locked by the mutual snap-fit between the telescopic snap protrusion 125 and the base main body 11, and the downward displacement is locked by the interaction between the third locking member 123 and the fourth locking member 126.

A limiting hole 117 is further provided below the first pivot hole 131, a limiting card 127 of a telescopic locking member 122 is snapped in the limiting hole 117, and when it is necessary to release the locking of the telescopic member 12 by the telescopic locking member 122, a force is applied to the limiting card 127 to displace the limiting card in a direction away from the telescopic member 12, so that the fourth locking member 126 is disengaged from the third locking member 123.

As shown in FIGS. 17-22, the lock body 20 of the both opening and closing directions lockable door stop according to Embodiment 1 has the following specific structure, so that the lock body can be assembled without using screws or adhesion methods (e.g., adhesive, hot melting).

The lock body 20 includes a lock case 21 and a case cover 22, a first lock cavity 104 extending in a first direction is formed in the lock case 21, the case cover 22 is assembled at a lock cavity opening 105 of the first lock cavity 104 to close the lock cavity opening 105, and the lock cavity opening 105 is arranged downward in the first direction. Lock surfaces 207 are respectively formed on two opposite surfaces of the lock case 21, a first side port 202 provided toward a front side is provided on one lock surface 207, and a second side port 203 provided toward a rear side is provided on the other lock surface (i.e., on a side wall of the lock case 21 in the opposite direction to the first side port 202).

Figure 18:
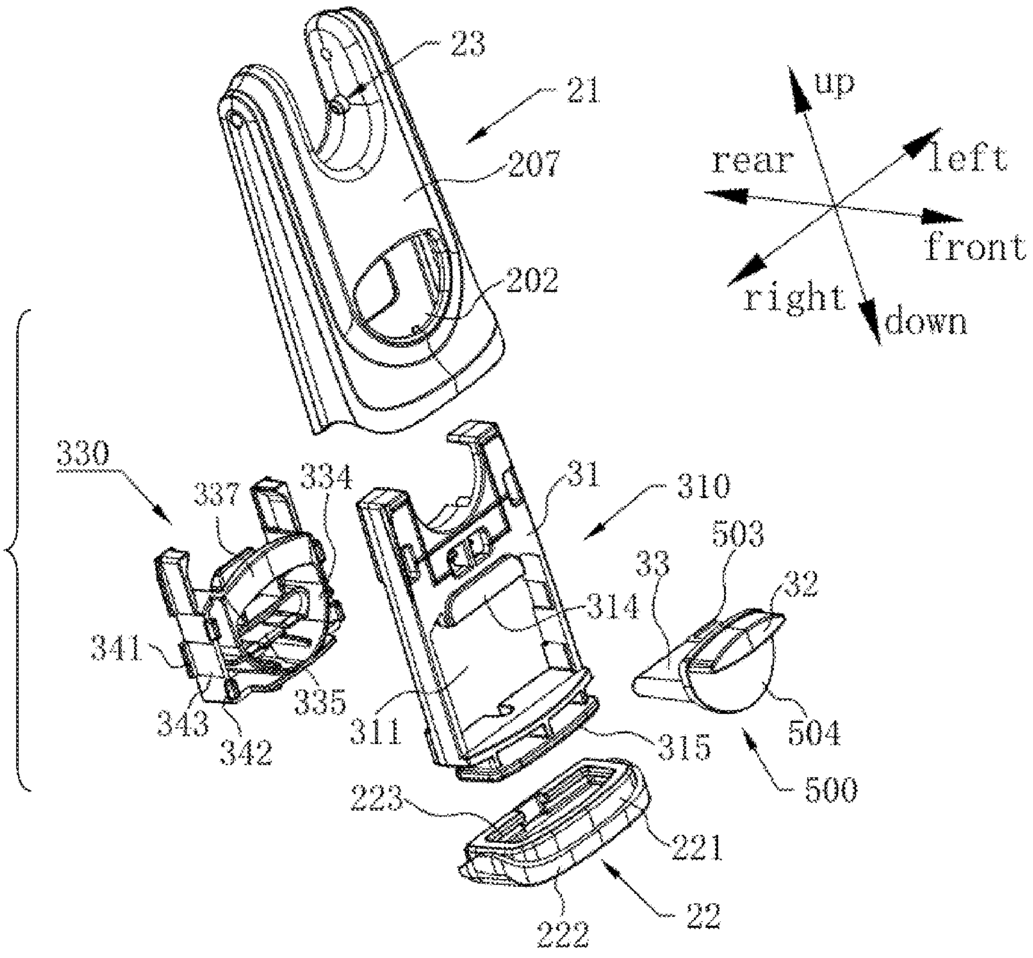
FIG. 18 is a structural exploded view of FIG. 17 with directions indicated to facilitate understanding of the present invention.
Figure 19:
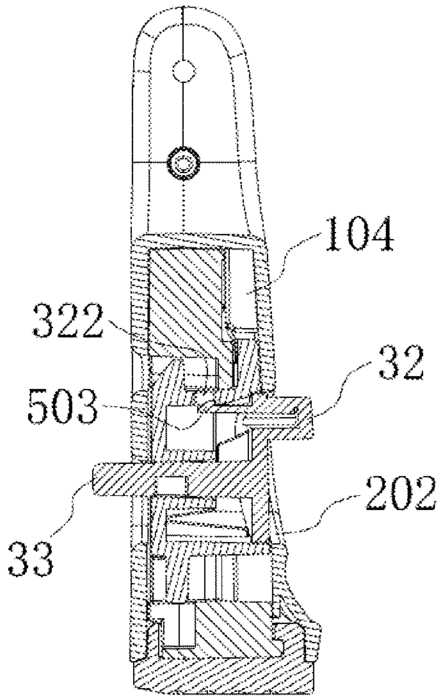
FIG. 19 is a cross-sectional view of FIG. 17.

As shown in FIG. 18, the first direction refers to the up-down direction shown in FIG. 2, and a second direction refers to a front-rear direction. The first lock cavity 104 substantially extends along a length direction of the lock case 21 and is hollowly formed in the lock case 21, so that the lock cylinder member 310 is limited by a side wall of the first lock cavity 104 in the left-right direction and the front-rear direction. One end of the first lock cavity 104 (i.e., the end close to an upper side) is a closed end and the other end (i.e., the end close to a lower side) is open to form the lock cavity opening 105.

Figure 22:
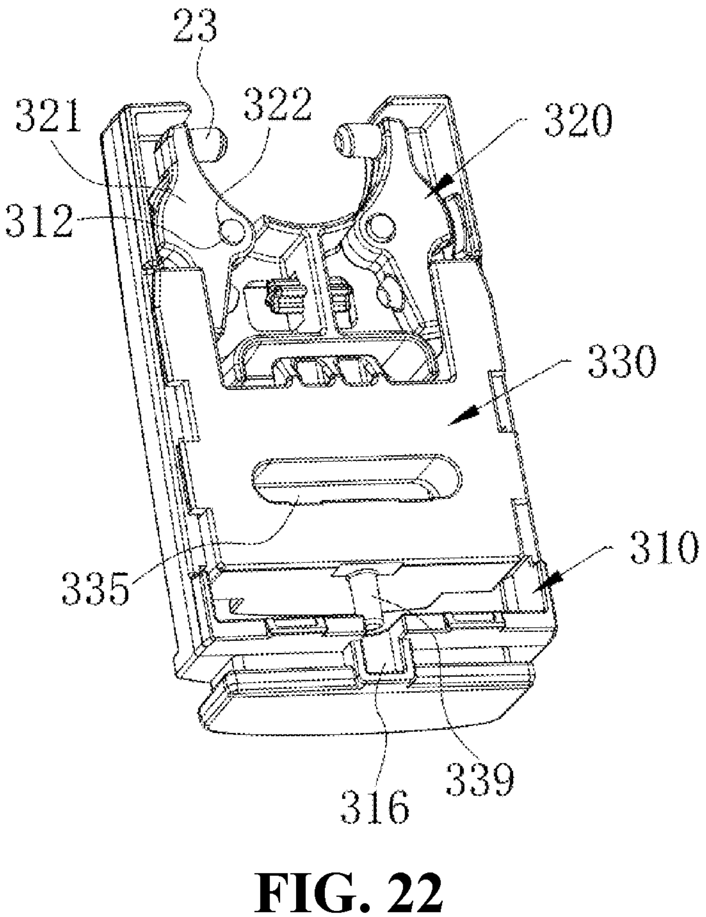
FIG. 22 is an assembly view of a lock cylinder member, a swing member, and an unlocking member in FIG. 17, with a return spring of the swing member not shown.

After the lock cylinder member 310, the swing member 320 and the unlocking member 330 are assembled into a state as shown in FIG. 22, the lock cylinder member 310, the swing member 320 and the unlocking member 330 are loaded into the first lock cavity 104 from the lock cavity opening 105, then a driving member 500 is loaded from the first side port 202, and the second key 33 arranged on the driving member 500 passes through a second mounting port 335 and then is convexly arranged at the second side port 203, so that the first key 32 and the second key 33 are movably mounted in the first side port 202 and the second side port 203 respectively, and the first side port 202 and the second side port 203 are both long holes in the up-down direction; that is, their length in the up-down direction is greater than lengths of corresponding portions of the first key 32 and the second key 33 which are correspondingly arranged in a penetrating way, so that the first key 32 and the second key 33 can be reciprocally slidable in the up-down direction in both side ports, so that the user can lock or unlock the lock body by operating up-down sliding of the two tongue members.

Figure 20:
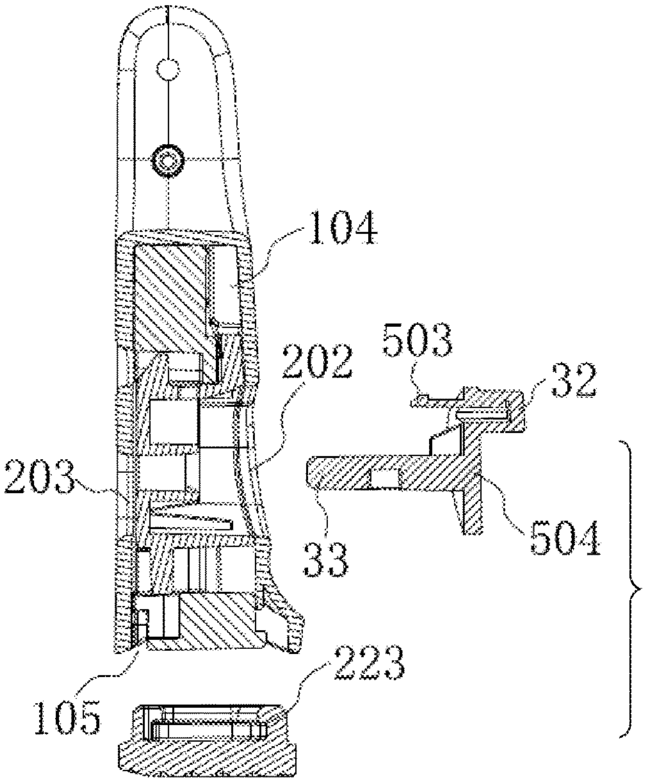
FIG. 20 is an exploded schematic view of a driving member in the cross-sectional view of FIG. 19.
Figure 21:
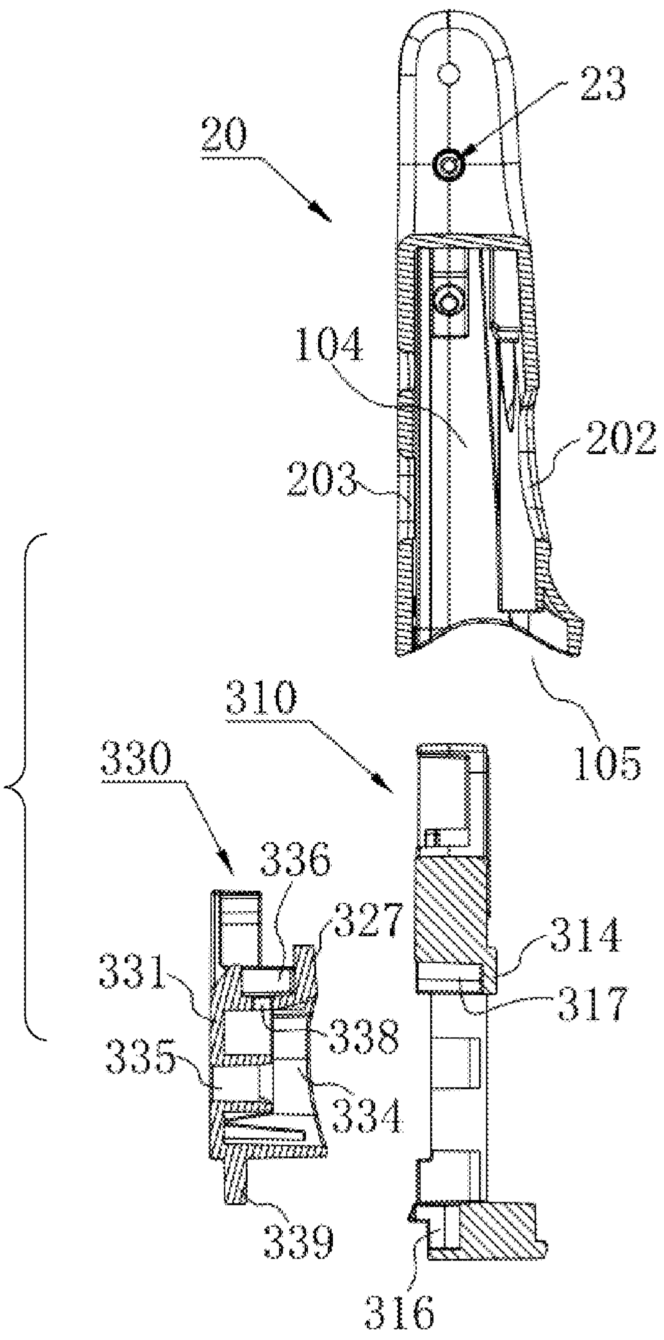
FIG. 21 is an exploded schematic view of other components in the cross-sectional view of FIG. 19, with the exploded driving member in FIG. 20 not shown.

In the present embodiment, the driving member 500 further has a second snap member 503 for snap-fit with the unlocking member 330, and a liner 504 that covers the first side port 202, and the liner 504 can prevent the internal structure from being directly visible, and the liner can also abut against an inner wall of the lock case 21 to play a guiding role when the first key 32 is displaced downward. As shown in FIG. 20, the second key 33 and the second snap member 503 are convexly arranged on a left side of the liner 504, and the first key 32 is convexly arranged on a right side of the liner 504.

Preferably, the first side port 202 is a D-shaped hole, and the second side port 203 is a rectangular hole.

As shown in FIG. 22, the swing column 312 is convexly arranged on the lock cylinder member 310, the swing shaft hole 322 is arranged at the middle portion of the swing arm member 321, the swing shaft hole 322 is sleeved on the swing column 312 to enable the swing member 320 to be pivotally and movably mounted on the lock cylinder member 310, and the user pushes the first key 32 or the second key 33 to drive the unlocking member 330 to displace downward with respect to the lock cylinder member 310, and the swing member 320 is driven to rotate around the swing column 312 on the lock cylinder member 310 via mutual contact between the second contact surface 333 arranged on the driving arm 332 and the first contact surface 323 arranged on the swing arm member 321, so that the lock column 23 arranged at the upper end of the swing member 320 is retracted and unlocked. Here, the driving arm 332 is arranged at the upper end of the unlocking member 330, and when the unlocking member 330 is displaced downward, the driving arm 332 acts on the outer side of the lower end of the swing member 320 to cause the first contact surface and the second contact surface to contact with each other to drive the lower end of the swing member 320 to rotate inward.

Preferably, the return spring (not shown in FIG. 22) is provided between the lower end of the unlocking member 330 and the lock cylinder member 310, for which a return spring column 339 is provided on the lock cylinder member 310, and a spring cavity 316 is provided inside the lower end of the swing member 320.

As shown in FIGS. 18-21, the lock cylinder member 310 includes a lock cylinder main body 31, a first mounting port 311 provided in a penetrating way is provided on the lock cylinder main body 31, a first mounting cavity 317 provided on a rear side of a top wall of the first mounting port 311, and a first bump 314 convexly provided on a front side of the top wall. In the present embodiment, the first mounting port 311 is a through hole, and a second connecting portion 315 for connecting the case cover 22 is provided at a top end of the lock cylinder main body 31. A connecting member 221 is formed at an upper end of the case cover 22, a cover main body 222 is formed at a lower end thereof, and a first connecting portion 223 is provided on the connecting member 221, and the first connecting portion 223 is configured for connecting with the second connecting portion 315.

The unlocking member 330 includes an unlocking main body 331, a second mounting portion 334 which can be assembled in the first mounting port 311 is provided on the unlocking main body 331, the second mounting port 335 is arranged in the second mounting portion 334 in a penetrating way, the concave cavity 336 is recessed on a top wall of the second mounting portion 334, the concave cavity 336 is arranged on a periphery of the lock tongue 152, a second bump 337 is provided on a front side of the concave cavity 336, and after assembly, the first bump 314 is located in the concave cavity 336, and the second bump 337 is limited on an outer side of the first bump 314. A snap opening is provided below the top wall of the second mounting portion 334 as a first snap member 338, and the first snap member 338 is arranged in a penetrating manner to communicate with the concave cavity 336. The return spring column 339 is also arranged at a lower end of the second mounting part 334, and one end of the return spring (not shown in the figure) is fixedly mounted on the return spring column 339, and the other end thereof is located in the spring cavity 316 of the lock cylinder member 310, so that the unlocking member 330 is in an upper position under the action of the return spring without external force, and is pushed downward to compress the return spring.

Here, the unlocking member 330 is housed in the first mounting port 311 of the lock cylinder member 310 as a whole, a first snap protrusion 341 and a second snap protrusion 342 are respectively provided on both sides of the unlocking member 330, the first snap protrusion 341 and the second snap protrusion 342 respectively abut against both sides of a side wall of the first mounting port 311 after assembly, and a first side wall 343 located between the first snap protrusion 341 and the second snap protrusion 342 is located at an inner side of the side wall of the first mounting port 311.

The second snap member 503 is provided on the driving member 500, the second snap member 503 is composed of a snap tongue and has appropriate elasticity, and can be bent and deformed appropriately to achieve snap fit or separation, and the second snap member 503 is configured to be snapped into the first snap member 338 to snap the driving member 500 and the unlocking member 330.

The assembly process of the lock body 20 of the present embodiment is as follows.

Firstly, the unlocking member 330 is assembled to the lock cylinder member 310, that is, the unlocking member 330 is first approached from the rear of the lock cylinder member 310 for fitting, and then the unlocking member 330 is displaced upward by a suitable distance to place the first bump 314 in the concave cavity 336 (this process may be pushed by the user or driven by the return spring). In addition, the swing member 320 is pivotally mounted to the lock cylinder member 310.

Secondly, the whole assembled lock cylinder 30 is placed into the lock case 21 from bottom to top, that is, assembled into the first lock cavity 104 from the lock cavity opening 105, and the size of the lock cylinder 30 enables it to be preliminarily positioned in the first lock cavity. 04.

Finally, the driving member 500 is assembled into the first lock cavity 104 from the first side port 202, and the driving member 500 is snap-fitted with the unlocking member 330, and the second key 33 is exposed at the second side port 203 after penetrating the unlocking member 330, so that the driving member 500 can limit the lock cylinder 30 to prevent the lock cylinder from coming out of the first lock cavity 104.

In addition, the case cover 22 is assembled to a lower end of the lock cylinder member 310 in the first step, or the case cover 22 is mounted after the final assembly is completed.

What is claimed is:

1. A both opening and closing directions locking door stop for being fixed to a door leaf for locking to prevent opening and closing of the door leaf, comprising:

a base for being fixed to the door leaf, the base comprising a base main body and a telescopic member, the telescopic member being telescopically and movably arranged with respect to the base main body, the base main body being provided with a first surface for being fitted to a surface of the door leaf, and the telescopic member being provided with a second surface for being fitted to a bottom surface of the door leaf;

a lock body, the lock body being rotatably pivoted to the base about a pivot, the lock body being rotatably arranged between a first state and a second state, the lock body being arranged downward in a direction parallel to the first surface in the first state and being arranged upward in a direction parallel to the first surface in the second state; and the door stop being configured to lock the door leaf in the first state and unlocks the door leaf in the second state;

a first locking assembly for locking the lock body in the first state, the first locking assembly comprising a first locking member and a second locking member, one of the first locking member and the second locking member is provided on the lock body and another one is provided on the base, the second locking member acting to engaging with the first locking member or separating from the first locking member; and the lock body is pivotally connected to the base about a pivot at an upper end thereof to enable the lock body to be rotatably pivoted to the base about the pivot, and an abutting end is formed at a lower end of the lock body, and the abutting end is made of a soft material to be pressed and deformed in the first state; the abutting end be on.

2. The both opening and closing directions locking door stop according to claim 1, wherein the two-way locking door stop is adhesively fixed to the surface of the door leaf at the first surface and adhesively fixed to the bottom surface of the door leaf at the second surface.

3. The both opening and closing directions locking door stop according to claim 2, wherein an adhesive is provided at the first surface or the second surface in advance, and a positioning mechanism or a limiting mechanism is provided on the base.

4. The both opening and closing directions locking door stop according to claim 1, wherein the base main body is fixed to the surface of the door leaf by screws so that the first surface abuts against the surface of the door leaf, and is adhesively fixed to the bottom surface of the door leaf at the second surface, or the second surface abuts against the bottom surface of the door leaf.

5. The both opening and closing directions locking door stop according to claim 1, wherein the lock body comprises a lock case and a case cover, the case cover is made of soft rubber and snapped at an end portion of the lock case, and the abutting end is formed on the case cover.

6. The both opening and closing directions locking door stop according to claim 5, wherein a plurality of air cavities are provided on an end surface of the case cover.

7. The both opening and closing directions locking door stop according to claim 5, wherein the lock body further comprises a lock cylinder mounted in the lock case, and the lock cylinder is provided with a lock tongue and a first key; a first side of the lock case is provided with a first side port, a second side thereof is provided with a concave hole, the first key is arranged in the first side port, and the lock tongue is arranged at the concave hole; the first locking member comprises a convex member convexly provided on one side of the base and a first lock hole provided on the convex member, and the concave hole and the lock tongue constitute the second locking member; and in the first state, the convex member is inserted into the concave hole to cause the lock tongue to extend into the first lock hole to lock rotation of the lock body, and the first key is configured to unlock rotation locking of the lock body to allow the lock body to rotate from the first state to the second state.

8. The both opening and closing directions locking door stop according to claim 7, wherein the second side of the lock case is further provided with a second side port, the lock cylinder is provided with a second key, the second key is arranged in the second side port, and the second key is configured to unlock the rotation locking of the lock body to allow the lock body to rotate from the second state to the first state.

9. The both opening and closing directions locking door stop according to claim 8, wherein the lock body is further provided with a lock column driven by the lock cylinder, the lock case is provided with a second lock hole, the lock column is telescopically and movably arranged in the second lock hole and is driven by the lock cylinder to displace and move to unlock, a pivot seat of the base is provided with a first through hole, and in the second state, the lock column can be snapped into the first through hole to lock and hold the lock body.

10. The both opening and closing directions locking door stop according to claim 8, wherein a first lock cavity is provided in the lock case, the first side port and the second side port are respectively provided at both sides of the lock body, and a lock cavity port is formed at a lower end of the first lock cavity;

the lock cylinder comprises a lock cylinder member, a swing member and an unlocking member, and the swing member is pivotally mounted on the lock cylinder member about a swing column as a pivot; and the unlocking member is movably and displaceably mounted on the lock cylinder member in a first direction, a driving arm of the unlocking member acts on the swing member to drive the swing member to pivot, and the lock tongue is arranged on the unlocking member.

11. The both opening and closing directions locking door stop according to claim 10, wherein the lock cylinder member comprises a lock cylinder main body, the lock cylinder main body is provided with a first mounting port, and the unlocking member is mounted in the first mounting port to displace and move in the first direction;

the lock cylinder comprises a driving member, the unlocking member is provided with a second mounting port, and the first key and the second key are respectively arranged on both sides of the driving member;

after the lock cylinder member and the unlocking member are loaded into the first lock cavity from the lock cavity port, the driving member is assembled into and snap-fitted with the unlocking member from the first side port;

a third side port is provided on the lock case, the lock tongue is arranged on the unlocking member, a concave cavity is provided on a periphery of the lock tongue, and the lock tongue positionally corresponds to the third side port; and the second key is mounted in the second side port after passing through the second mounting port.

12. The both opening and closing directions locking door stop according to claim 1, wherein a cavity is provided in the base main body;

the telescopic member is an L-shaped member, and comprises a first arm and a second arm, the first arm is assembled in the cavity, and the second arm extends in a direction perpendicular to the first arm; and the first locking member is arranged on a side of the base main body away from the second arm.

13. A method for both opening and closing directions locking of a door leaf, comprising:

providing a door stop, the door stop comprising a base, a lock body and a first locking assembly, the base comprising a base main body, a telescopic member, and a first surface provided on the base main body and a second surface provided on the telescopic member, the lock body being rotatably pivoted to the base about a pivot to be rotatably arranged between a first state and a second state, the lock body being arranged downward in a direction parallel to the first surface in the first state and being arranged upward in a direction parallel to the first surface in the second state; and the first locking assembly comprising a first locking member and a second locking member one of the first locking member and the second locking member is provided on the lock body and another one is provided on the base, the second locking member acting to engaging with the first locking member or separating from the first locking member;

fixing the door stop to the door leaf, ensuring that a length of a working section of the lock body is greater than a distance from the pivot to the ground during fixing; and operating the door leaf and the door stop to achieve two-way locking of the door leaf, comprising: when the door leaf is opened and in a position to be locked, turning the lock body until an end thereof is in contact with the ground, so that the first locking member is engaged with the second locking member, thereby locking rotation of the lock body to achieve the two-way locking of the door leaf.

14. The method according to claim 13, wherein the step of fixing to the door leaf, including: ensuring that the lock body of the door stop being in the first state, fitting the base main body to the door leaf for positioning before mounting, the telescopic member is adjusted to be displaced upward with respect to the ground by a predetermined distance, then the lock body is rotated to the second state, a lower end of the telescopic member is placed close to the ground and the base main body is mounted to the door leaf, and finally the telescopic member is moved up to be fitted to a bottom end surface of the door leaf.

15. The method according to claim 13, wherein the telescopic member of the door stop is provided with a maximum extension length of a value in advance.

16. The method according to claim 13, wherein the telescopic member of the door stop has a scale for displaying a telescoping value during telescoping adjustment.

17. The method according to claim 13, for unlocking the door stop, driving a first key to unlock engagement of the first locking member and the second locking member, then rotating the lock body from the first state toward to the second state, and the first key is movably arranged on one side of the lock body.

* * * * *